United States Patent

[11] 3,631,703

[72] Inventors Benjamin F. Bregi
Grosse Pointe Shores;
Warren C. McNabb, Detroit; David W. Daniel, Birmingham, all of Mich.
[21] Appl. No. 866,628
[22] Filed Oct. 15, 1969
[45] Patented Jan. 4, 1972
[73] Assignee Lear Siegler, Inc.
Santa Monica, Calif.

[54] GEAR ROLLING DIE AND METHOD OF USE
16 Claims, 4 Drawing Figs.
[52] U.S. Cl. .................................................... 72/108,
29/159.2
[51] Int. Cl. ........................................................ B21h 5/00
[50] Field of Search .......................................... 72/94, 1.02,
1.08; 29/159.2

[56] References Cited
UNITED STATES PATENTS
3,362,059  1/1968  DiPonio et al. .................. 29/159.2

*Primary Examiner*—Lowell A. Larson
*Attorney*—Whittemore, Hulbert & Belknap

ABSTRACT: A gear rolling die in the form of a gear having teeth generally conjugate to the desired form of teeth on the work gear, but provided with protuberances adjacent the tips of the teeth to form undercuts adjacent the roots of the work gear. Preferably, the die teeth are provided with inclined ramps adjacent the roots for engagement with the corners of the gear teeth provided by the intersections of the top and side surfaces of the teeth thereof. In gear production the undercuts are provided in rough rolling and form spaces into which material is displaced during finish rolling.

PATENTED JAN 4 1972  3,631,703
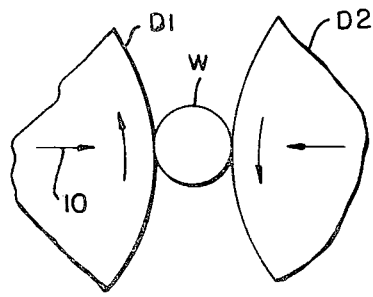
FIG.1
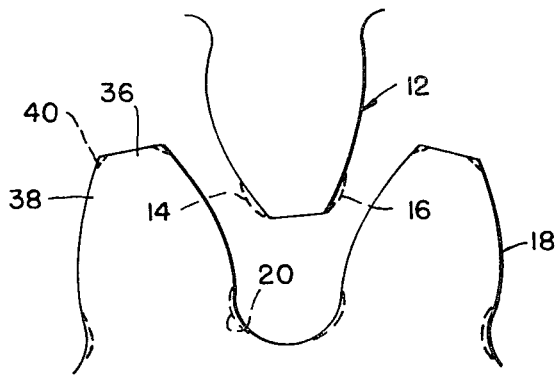
FIG.2
FIG.3
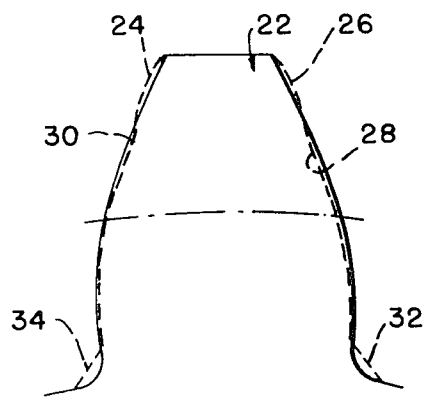
FIG.4
INVENTORS
BENJAMIN F. BREGI
WARREN C. McNABB
BY DAVID W. DANIEL
Whittemore, Hulbert
& Belknap ATTORNEYS

GEAR ROLLING DIE AND METHOD OF USE

CROSS REFERENCE TO RELATED APPLICATION

The present application is related to application of Daniel et al., Ser. No. 781,420, filed Dec. 5, 1968.

BRIEF SUMMARY OF THE INVENTION

There has recently been a revival of interest in finishing gears by a rolling operation in which a work gear is rotated in mesh under pressure conditions with one or more gearlike dies.

In the finishing operation the gears are formed in a previous operation to approximately the required form but with a slight excess amount of material, as for example a few thousandths of an inch in thickness. The rolling operation displaces the excess material to bring the gear teeth to the required dimension and at the same time provides a smooth accurately finished surface.

In the finish rolling operation the specific nature of the contact between the surfaces of the die teeth and the surfaces of the gear teeth varies during contact. The contact between unmodified involute teeth of cylindrical gears operating on parallel axes is essentially a line contact, and where the teeth are spur teeth the line of contact extends parallel to the axes of the gears.

The line of contact on each tooth surface moves from adjacent the root to adjacent the tip or vice versa depending upon whether the tooth surface is the leading side or the trailing side of a gear tooth. In addition to the migration of the line of contact there is a variation in the sliding action between the tooth surfaces at the point of contact. This sliding action is a maximum adjacent the root and crest of the teeth and diminishes to zero at the pitch line. In addition, the direction of sliding reverses at the pitch line where no sliding occurs, even though the migration of the line of contact continues in the same direction.

At least in part, due to considerations arising from the foregoing conditions, there is a tendency for the material displaced during a gear finishing operation to buildup at the portion of the gear tooth adjacent the base or root thereof where the tooth surface leaves contact with the mating tooth of the die.

In addition, it is desirable in some instances in gear design to produce a finished gear having a relief or undercut adjacent the root of the teeth below the start of active profile (SAP) or below the beginning of true involute profile (TIP).

In accordance with the present invention a die, normally used as one of a pair of opposed dies, is provided in the form of a cylindrical gear. The teeth of the die are generally conjugate to the desired form of teeth on the work gear, but as will be explained hereafter, may have certain specific modifications in order to produce true involutes or desired variations thereof on the teeth of the gear. In addition however, the teeth of the die are provided with protuberances at the sides of teeth adjacent the crests thereof. These protuberances, as is well understood, normally have engagement with root portions of the teeth of the work gear and will accordingly produce relief or undercuts adjacent the root portions.

In the production of gears by operations which include both rough rolling and finish rolling, the protuberances are provided on the teeth of the roughing dies so as to produce the relief or undercuts on the rough rolled gears which will provide zones into which material displaced downwardly from the flanks of the gear teeth during a finish rolling operation, may be received. However, the present invention also contemplates the provision of protuberances at the side of the teeth of finish rolling dies adjacent the tops or crests thereof so as to produce the relief or undercut adjacent the roots of the finished gear teeth.

The die teeth may and normally will have further modification from a true involute. These modifications may be for the purpose of providing conjugate modifications on the teeth of the gear or it may be found necessary to produce desired tooth forms on the gear which may not be strictly conjugate to the tooth surface of the die.

Moreover, the dies disclosed herein are normally operated in a single direction of rotation with respect to a work gear with the results that the rolling action at opposite sides of the gear teeth are not exactly the same. Accordingly, it has been found necessary to provide somewhat different modifications at opposite sides of the die teeth in order to produce gear teeth opposite sides of which are identical.

Finally, the present invention includes dies which have a further modification in that adjacent the roots of each tooth there is provided an inclined ramp which extends at an angle to the adjacent flank surface of the tooth. These ramps are positioned to engage the top corners of the gear teeth provided by the intersections between the top and side surfaces of the teeth of the gear.

BRIEF DESCRIPTION OF THE DRAWINGS

FIG. 1 is a diagrammatic view suggesting the relationship between a work gear and a pair of opposed gear rolling dies.

FIG. 2 is an elevational view of a single tooth of a gear rolling die.

FIG. 3 is an elevational view of a pair of gear teeth produced by the rolling action of the die.

FIG. 4 is an elevational view of a further modified die tooth.

DETAILED DESCRIPTION

Referring first to FIG. 1 there is indicated a work gear W which is positioned between two gear rolling dies D1 and D2. In this Figure, for simplicity, no attempt is made to illustrate the teeth of the work gear or dies.

In the operation where the dies D1 and D2 are gear finishing dies, they are preferably geared together and driven in rotation in accurate synchronism. The work gear, which has slightly oversized teeth formed thereon by any desired operation such as rough rolling, hobbing, shaping, or the like, is preferably initially driven in a nonpositive manner at the proper speed for meshed rotation with the dies. Actually, the nonpositive rotation of the gear W is generally slightly faster or slower than such theoretically correct rotation to bring about meshing between the teeth of the gear and dies during automatic loading operations. While the parts are then positively driven in rotation, the gear being driven at this time by the dies, the dies are moved relatively towards each other as indicated by the arrows 10. In practice, one of the dies is conveniently maintained fixed while the other die and the work gear are moved toward the die occupying the fixed position.

The same operation may be carried out for rough rolling the gears to a slightly oversize but approximately final condition. In this case the present practice is to gash the blank in accordance with the required number of teeth, which thereafter insures correct rotation between the dies and gear. Alternatively, the work gear may be a smooth cylindrical blank, in which case the circumference of the blank must be exactly equal to the circular pitch of the teeth of the die at the O.D. of the die multiplied by the number of teeth of the gear.

It will be recognized of course that where a gear is formed by producing teeth from a smooth cylindrical blank by a rolling operation, the material displaced from the blank by penetration of die teeth into its peripheral surface necessarily is displaced outwardly beyond the initial peripheral surface of the blank. This of course does not take into account material which may be displaced axially of the blank but this occurs chiefly at the sides of the work blank or adjacent the ends of the teeth, and does not influence tooth form centrally of the finished gear.

Referring now to FIG. 2 there is illustrated a single tooth 12 of a gear rolling die. This tooth is of generally involute form although the involute thereof may be slightly modified as will subsequently be described. However, in addition to any involute modification which may or may not be applied, the die tooth is characterized by the provision of protuberances 14 and 16. Adjacent the crests or tips of the teeth these protuberances are smoothly curved outward projections. The maximum height of these protuberances above the involute form as observable on a standard involute checker, will be between 0.0002–0.0040 inches, and preferably between 0.0005–0.0030 inches.

In some cases the protuberances will be symmetrical. However, in other cases they may be unsymmetrical. The gear rolling operations contemplated herein are usually carried out by rolling the gear and dies in a single direction so that the actions at opposite sides of the gear teeth by opposite sides of the die teeth differ. Thus, where it is essential to have equal relief or undercuts in the gear teeth, and where the rolling operation is carried out by rolling in a single direction, there may be unsymmetrical protuberances. However, the difference in height of the protuberances should not exceed 0.001 inches.

Referring now to FIG. 3 the gear teeth 18 are illustrated as relieved or undercut as indicated by the dotted lines 20, these reliefs or undercuts being of course produced by the rolling action of the die teeth and particularly, by the protuberances 14 and 16 thereon.

Referring now to FIG. 4 there is illustrated a single tooth 22 of a die which in addition to the protuberances here indicated in dotted lines at 24 and 26, are further modified. In this Figure the shape of an unmodified involute tooth is shown in full lines and the further modifications, like the protuberance modifications 24 and 26, are also shown in dotted lines. There is an involute modifications 28 and 30 at each side of the tooth, this modification being a minus involute modification as observable on a standard involute checker, of substantially uniform amount commencing adjacent the roots of the teeth and extending upwardly to and merging smoothly into the protuberance modifications 24 and 26. These involute modifications may be symmetrical at opposite sides of the teeth or they may by unsymmetrical. Where the rolling operation is intended to be carried out by rotation in one direction, and where the gear teeth are intended to be symmetrical at opposite sides, it will be usual for the involute modification to differ somewhat at opposite sides of the teeth. On the other hand, the involute modification may be for the purpose of producing a generally conjugate modification in the gear teeth as for example a uniform minus involute modification extending upwardly from the upper portion of the undercuts to adjacent the crests of the teeth. In a specific embodiment of the invention where the diametral pitch of the teeth is approximately 20, the amount of minus involute modification provided on the die teeth is approximately 0.0012 inch, and increases uniformly from the root to the protuberances provided at the top portions of the teeth.

A further modification of the die teeth is indicated by inclined ramps 32 and 34 which are provided adjacent the roots of the die teeth as indicated in FIG. 4, and which are dimensioned to engage the crests of the gear teeth and specifically, the corners provided by the intersections of the top surfaces 36 thereof and the flanks 38. These chamfer modifications are indicated in dotted lines at 40 in FIG. 3.

As previously indicated, the protuberance modification of the die may be provided only on the roughing die in order to provide relief or undercut areas as indicated at 20 on the rough rolled gear. In this case the relief or undercut is primarily useful in permitting a finish operation in which material is displaced into the relief or undercut. However, it may be provided on finishing dies, in which case it provides undercut or relief areas desired on the finish rolled gear.

The inclined ramps 32 and 34 engage the top corners of the gear teeth and shape the displaced metal into zones in which it does not interfere with conjugate gear action of the finish roll gear.

What we claim as our invention is:

1. A die for rolling cylindrical gears, said die being in the form of a cylindrical gear substantially conjugate to the final form of work gear to be rolled by the die, the teeth of said die being modified from conjugate form by having in the sides thereof adjacent the tips of the teeth smoothly curved protuberances.

2. A die as defined in claim 1 in which said protuberances are located in their entirety substantially outwardly of the pitch diameter of the die teeth.

3. A die as defined in claim 2 in which said die teeth have profiles which are substantially involute, and in which said protuberances extend outwardly of the teeth beyond the involute profiles.

4. A die as defined in claim 3 in which the maximum amount which said protuberances extend outwardly beyond the involute profiles is 0.0002–0.0040 inches.

5. A die as defined in claim 3 in which the maximum amount which said protuberances extend outwardly beyond the involute profiles is 0.0005–0.0030 inches.

6. A die as defined in claim 3 in which the amount of maximum protuberances at opposite sides of the teeth is substantially equal.

7. A die as defined in claim 3 in which the amount of maximum protuberance at opposite sides of the teeth does not differ by more than 0.001 inches.

8. A die as defined in claim 1 in which the dies are designed for rotation in one direction only, and in which in addition to the protuberance modifications, the profiles of the teeth have involute modifications.

9. A die as defined in claim 8 in which the involute modification at opposite sides of the die teeth is different.

10. A die as defined in claim 9 in which the trailing side of the die tooth has more modification than the leading side.

11. A die as defined in claim 8 in which the involute modification is a substantially uniform minus involute modification commencing adjacent the start of true involute profile (TIP) and merging into the protuberance.

12. A die as defined in claim 11 in which the trailing side of the die tooth has more modification than the leading side.

13. A die as defined in claim 8 in which the amount of involute modification is equivalent to approximately 0.0012 inches for a die having a diametral pitch of about 20.

14. A die as defined in claim 1, each of said die having inclined ramps extending at a substantial angle to the adjacent tool surface and positioned to engage the top corners of the gear teeth to form chamfers at the intersection of the top and side surfaces of the gear teeth.

15. The method of making gears which comprises rough rolling a gear by rotating a blank in contact with a gearlike roughing die while providing a radial depth feed, forming an undercut in the gear teeth generally below the start of true involute profile by the action of protuberances on the sides of the die teeth adjacent the tips thereof, thereafter finish rolling the rough rolled gear by rolling it in mesh with a gearlike finishing die while providing a radial depth feed, and displacing materials from the lower portions of the gear teeth into the spaces provided by the undercuts therein.

16. The method as defined in claim 15 which comprises providing both the roughing and finishing dies in opposed pairs, driving them in synchronous rotation, and relatively feeding the dies of each opposed pair toward each other.

* * * * *